(12) United States Patent  
Howard

(10) Patent No.: US 7,958,194 B2
(45) Date of Patent: Jun. 7, 2011

(54) SYSTEM AND METHOD FOR PARALLEL PROCESSING USING A TYPE I HOWARD CASCADE

(75) Inventor: Kevin D. Howard, Tempe, AZ (US)

(73) Assignee: Massively Parallel Technologies, Inc., Boulder, CO (US)

(*) Notice: Subject to any disclaimer, the term of this patent is extended or adjusted under 35 U.S.C. 154(b) by 0 days.

(21) Appl. No.: 12/581,593

(22) Filed: Oct. 19, 2009

(65) Prior Publication Data

US 2010/0049941 A1 Feb. 25, 2010

Related U.S. Application Data

(63) Continuation-in-part of application No. 12/197,881, filed on Aug. 25, 2008, now Pat. No. 7,730,121.

(60) Provisional application No. 61/165,301, filed on Mar. 31, 2009, provisional application No. 61/166,630, filed on Apr. 3, 2009.

(51) Int. Cl.
*G06F 15/16* (2006.01)
(52) U.S. Cl. ........ 709/205; 709/201; 709/217; 709/218; 718/108; 706/10
(58) Field of Classification Search .............. 709/201, 709/205, 217, 218; 718/108; 706/10
See application file for complete search history.

(56) References Cited

U.S. PATENT DOCUMENTS

| | | |
|---|---|---|
| 5,166,674 A | 11/1992 | Baum et al. |
| 5,224,100 A * | 6/1993 | Lee et al. ............ 370/408 |
| 5,325,526 A | 6/1994 | Cameron et al. |
| 5,349,682 A | 9/1994 | Rosenberry |
| 5,371,852 A | 12/1994 | Attanasio et al. |
| 5,488,609 A | 1/1996 | Hluchyj et al. |
| 5,689,722 A | 11/1997 | Swarztrauber |
| 5,699,500 A | 12/1997 | Dasgupta |
| 5,758,144 A | 5/1998 | Eberhard et al. |
| 5,838,906 A | 11/1998 | Doyle et al. |

(Continued)

FOREIGN PATENT DOCUMENTS

EP 0107453 5/1984

(Continued)

OTHER PUBLICATIONS

Thibodeaux, "Organizers Hope to Give Lafayatte Superstart in High-Tech Direction", 10/27, Supercomputeronline.com, 2 pages.

(Continued)

*Primary Examiner* — Liangche A Wang
(74) *Attorney, Agent, or Firm* — Lathrop & Gage LLP

(57) ABSTRACT

A method using for performing a scatter-type data distribution among a cluster of computational devices. A number of nodes (equal to a value Cg, the number of tree generator channels) are initially generated, each connected to an initial generator, to create respective initial root nodes of an initial tree structure. Data is transmitted from the initial generator to each of the initial root nodes. Cg root nodes, each connected to a respective new generator, are generated to create respective roots of Cg newly generated tree structures. Each of the tree structures is expanded by generating Ct (the number of communication channels per node in each tree structure) new nodes connected to each node generated in each previous step. Data is then transmitted to each of the new nodes from an immediately preceding one of the nodes, and from each new generator to an associated root node.

20 Claims, 10 Drawing Sheets

U.S. PATENT DOCUMENTS

| | | | |
|---|---|---|---|
| 5,857,076 | A | 1/1999 | Schmidt |
| 5,860,010 | A | 1/1999 | Attal |
| 5,905,736 | A | 5/1999 | Ronen et al. |
| 5,943,652 | A * | 8/1999 | Sisley et al. .................... 705/9 |
| 6,014,669 | A * | 1/2000 | Slaughter et al. ............ 707/610 |
| 6,117,180 | A * | 9/2000 | Dave et al. ..................... 703/20 |
| 6,154,765 | A * | 11/2000 | Hart ............................. 709/201 |
| 6,163,855 | A * | 12/2000 | Shrivastava et al. ............. 714/4 |
| 6,167,428 | A * | 12/2000 | Ellis ............................. 709/201 |
| 6,295,573 | B1 * | 9/2001 | Bailey et al. ................. 710/260 |
| 7,096,263 | B2 * | 8/2006 | Leighton et al. ............. 709/224 |
| 2001/0011294 | A1 * | 8/2001 | Ellis, III ....................... 709/201 |
| 2003/0135614 | A1 * | 7/2003 | Hattori et al. ................. 709/224 |
| 2003/0195938 | A1 * | 10/2003 | Howard et al. ............... 709/208 |
| 2006/0143557 | A1 * | 6/2006 | Chan et al. .................... 715/500 |

FOREIGN PATENT DOCUMENTS

| | | |
|---|---|---|
| EP | 0640930 | 5/1995 |
| EP | 0921485 | 6/1999 |
| EP | 1031923 | 8/2000 |
| EP | 1096378 | 5/2001 |
| WO | 9427216 | 11/1994 |
| WO | 9919807 | 4/1999 |
| WO | 0101219 | 1/2001 |

OTHER PUBLICATIONS

IBM, "Cluster-Based Stack Optimization Algorithm for Very Large-scale Integration", Sep. 1987, IBM Technical disclosure Bulletin, vol. 30, Issue 4, p. No. 1445-1447 (4).

Chong et al, "Concurrent Processing for Picture Archiving and Comunication system (PACS)", Jun. 1995, IEEE, p. No. 468-472.

Antaki et al, "The soft side of New Enterprise", May 1999, MIT enterprise FORUM of Dallus Network Inc., 2 pages.

Hitachi, "The Next Generation of Information Technology", spring 97, Hitachi today No. 39, p. No. 1-6 and cover page.

Kahaner, "Fujitsu's 2.sup.nd Parallel computing WS (PCW'93) Nov. 1993 Kawasaki Japan" Dec. 1993, 15 pages.

Ryan et al, "A Scalable Distributed Multimedia Knowledge Retrieval System on a cluster of Heterogeneous High Performance Architectures", International Journal on artificial intelligence tools, vol. 9, No. 3 (2000) p. No. 343-367.

(author unknown), "CAD comes on line", Feb. 21, 2000, p. s-28, Design News-Automotive.

Danny Hillis, "Massive, Parallel Supercomputers—Where they're Going—How They'll Work", Forbes ASAP, Feb. 22, 1999, pp. 60-62 and 64.

Internet Information article: "MSC.SOFTWARE Announces visualNastran 4d2Go; A total Engineering Solution to be Bundled with CAD Products", Mar. 6, 2000.

Cohen, Ed et al. Efficient Covexity and Domination Algorithms for Fine-and Medium-Grain Hybercube Computers, Algoithmica, vol. 7, pp. 51-75, Springer Verlag New York, Inc., 1992.

Benedicts, E.P., "Multiprocessor architectures are converging", Hypercube Concurrent Computers and Applications: Proceedings of the third conference on Hypercube concurrent computers and applications: Architecture, software, computer systems, and general issues, vol. 1, pp. 12-20, Pasadena, California, Jan. 19-20, 1988.

Livingston, Marilyn L. and Stout, Quentin F., "Fault Tolerance of the Cyclic Buddy Subcube Location Sceme in Hypercubes", Proceedings of the 6th Distributed Memory Computing Conference (1991), IEEE, pp. 34-41, 1991.

Fox, G.C., "What have we learnt from using real parallel machines on real problems?", Hypercube Concurrent Computers and Applications: Proceedings of the third conference on Hypercube concurrent computers and applications: Architecture, software, computer systems, and general issues, vol. 2, pp. 897-955, Pasadena, California, Jan. 19-20, 1988.

"Topologies—computational messaging for multicomputers", Hypercube Concurrent Computers and Applications: Proceedings of the third conference on Hypercube concurrent computers and applications: Architecture, software, computer systems, and general issues, vol. 1, pp. 580-593, Pasadena, California, Jan. 19-20, 1988.

Keagle, C., et al.: "Categorization and performance analysis of advanced avionics algorithms on parallel processing architectures" IEE, May 22, 1989, pp. 1722-1724.

Trystram D: "Scheduling parallel applications using malleable tasks on clusters" Parallel and Distributed Processing Syposium., Proceedings 15th International San Francisco, CA, USA Apr. 23-27, 2001, Los Alamitos, CA USA, IEE Comput. Soc, 2128-2135.

Min-Bin Chen, et al.: "Parallel 2d delaunay triangulations in hpf and mpi" Parallel and Distributed Processing Symposium, Proceeding 15th International San Francisco, CA, USA Apr. 23-27, 2001, Los Alamitos, CA, USA, IEEE Comput. Soc, 301-308.

Fernandez, E.B., et al: "Fault-tolerant parallel algorithms" Proceedings of Southeaston. Williamsburg, Spril 7-10 1991, Proceedings of the Southeast Conference, New York, IEEE, US vol. 1, Apr. 7, 1991, pp. 466-469.

Xiaxiong, Zhong, et al. "Optimal implantation of parallel divide-and-conquer algooriths on de Bruijn networks" Frontiers of assively Parallel Computatioh, 1992., Fourth Symposium on the McLean, VA, USA Oct. 19-21, 1992, Los Alamitos, CA, USA, IEEE Comput. Soc, US Oct. 19, 1992, pp. 583-585.

Welch, L.R., et al. "Metrics and techniques for automatic partitioning and assignment of object-based concurrent programs" Parallel and Distributed Processing, 1995. Proceedings. Seventh IEEE Symposium on San Antonio, TX, USA Oct. 25-28, 1995, Los Alamitos,CA, USA, IEEE Comput. Soc, US, Oct. 25, 1995, pp. 440-447.

Kwan, A.W., et al.: "Using parallel programming paradigms for structuing programs on distributed memory computers" IEE, Apr. 28, 1991, pp. 210-213.

Grundy, J: "Software architecture modelling, analysis an dimplementation with softarch" Proc 34th Hawaii International Conference on System Sciences, Jan. 3, 2001, pp. 3825-3834.

Pontelli, E., et al: "Automatic compile-time parallelization of prolog programs for dependent and-parallelism" Proc. of the Fourteenth International Conference on Logic Programming, [online] Jul. 1997, pp. 108-122, Retrievd from the Internet URL:http://citeseer.ist.psu. edu/cacxhe/papers/cs/16510/http:zSzzSzwww.cs.nmsu. eduzSzguptazSzacezSzstaticdap.pdf/pontelli97automatic.pdf> [retrieved Sep. 1, 2004].

Coddington, P.D., et al: "Web-based access to distributed high-performance geographic information systems for decision support" Proceedings of the Hawaii International Conference on System Sciences, XX, XX, Jan. 5, 1999, pp. 1-12.

"Method Sending Object Agent and Receiving Object Agent" IBM Technical Disclosure Bulletin, IBM Corp. New York, US, vol. 39, No. 12, Dec. 1, 2996, p. 43.

Cameron, I, et al.: "BT Webworld TM-WEB Hosting for Every business Need" British Telecommunications Engineering, British Telecommunications Engineering, London, GB, vol. 16, No. 4, 1998, pp. 273-278.

Saletore, V.A., et al.: "Parallel Computations on the CHARM Heterogeneous Workstation Cluster" High Performance Distributed Computing, 1994, Proceedings of the Third IEEE International symposium on San Francisco, CA, USA Aug. 2-5, 1994, Los Alamitos, CA, USA, IEEE Comput. Soc, Aug. 2, 1994, pp. 203-210.

Desouza-Batista, J.C., et al.: "A Sub-optimal 28 Assignment Of Application Tasks Onto Heterogeneous Systems" Heterogenous Computing Workshop, 1994, Proceedings Cancun, Mexico Apr. 26, 1994, Los Alamitos, CA USA, IEEE Comput Soc., 1994, pp. 9-16.

Ross, G.B. et al.: "A Scalable Multicomputer" Circuits And Systems, 1993, Proceedings Of the 36th Midwest Symposium On Detroit, MI, USA Aug. 16-18, 1993, New York, NY, USA, IEEE, Aug. 16, 1993, pp. 1117-1120.

Chowdhury, A., et al.: "Supporting Dynamic Space-Sharing On Clusters Of Non-Dedicated Workstations" Distributed Computing Systems, 1997, Proceedings Of the 17th International Conference In Baltimore, MD, USA May 27-30, 1997, Los Alamitos, CA, USA, IEEE Comput. Soc, US May 27, 1992, pp. 149-158.

Selected File History from related U.S. Appl. No. 09/603,020, 100 pages Sep. 16, 2003 through Oct. 14, 2004.

Selected File History from related U.S. Appl. No. 10/340,524, 44 pages Aug. 6, 2007 through Apr. 18, 2008.

Selected File History from related European Patent Application Serial No. 00944888.7, 37 pages, Jul. 1, 2004 through Sep. 22, 2006.

Selected File History from related European Patent Application Serial No. 03713226.3, 12 pages, Apr. 19, 2007 through Oct. 16, 2007.

International Search Report from related PCT Patent Application Serial No. PCT/US03/000787, 8 pages, Sep. 2, 2004.

International Search Report from related PCT Patent Application Serial No. PCT/US00/17576, 6 pages, Nov. 14, 2000.

* cited by examiner

SYSTEM AND METHOD FOR PARALLEL PROCESSING USING A TYPE I HOWARD CASCADE

RELATED APPLICATIONS

This application claims priority to U.S. Patent Application Ser. No. 61/165,301, filed Mar. 31, 2009 and U.S. Patent Application Ser. No. 61/166,630, filed Apr. 3, 2009, both of which are incorporated herein by reference.

This application is also a continuation-in-part of U.S. patent application Ser. No. 12/197,881, "Parallel Processing Systems and Method", filed Aug. 25, 2008 now U.S. Pat. No. 7,730,121, and incorporated herein by reference.

BACKGROUND

Two of the most important types of data movement for a parallel processing system are the scatter exchange and the gather exchange. A scatter exchange moves data from one or more locations specified by the user in a single direction away from the starting location(s) such that dispersed computational elements in the system gain access to the data. This is analogous to the scattering of seeds across a field to ensure that the widest seed dispersal is accomplished. A gather exchange is the opposite, wherein data is gathered from the dispersed computational elements and sent back to a user defined location or locations.

The two standard methods of performing a scatter exchange are the true broadcast and the tree broadcast. The true broadcast transmits the data all at the same time from some central location to all computational elements in a group. The problem with a true broadcast is that in order to provide reliable data transmission it must use an error correcting code (the simplest being a single dimensional checksum, which is subject to double bit errors) of sufficient length, given the channel fault rate. Alternatively, if no error detection/correction is employed, data transmission errors will inevitably occur at some point.

Error correction cannot guarantee that the transmitted data is correct, rather only that it is 'statistically' correct; thus additional data must be transmitted, effectively degrading the performance of the communication channel. For example, a Reed-Solomon ECC adds 8 percent overhead to a code while being able to handle up to a 4 percent data error rate (e.g., standard 188 data bytes transmitted plus 16 redundant bytes).

True broadcasts cannot use a faster method which employs a bi-directional communication channel that moves the first from the sender to the receiver and from the receiver back to the sender (which insures that the data is correct). This is because there are multiple receivers and only one sender, greatly increasing the safe data transmission time, thus eliminating the advantage of broadcasting the data.

Because of these issues, modern parallel computer systems typically use a tree broadcast, in which data is sent from one computational element to another using a binomial tree arrangement of computational elements. This binary tree solution allows a series of pair-wise exchanges rather than a single broadcast, making it possible to have safe data transmission. Instead of taking (dataset size)/(transmission time) time, as is the case with a true broadcast, a tree broadcast instead takes [(dataset size)*$\lg_2$(number of computational elements)]/(transmission time) time.

The approach, described herein, of using a mathematical forest (multiple parallel trees) consisting of binomial (or other function) trees has the advantage of a safe broadcast with a minimum performance that is twice that of the industry standard tree-broadcast. Gather exchanges always use a tree-broadcast model, but in reverse. The present approach is equally advantageous for a gather exchange.

DETAILED DESCRIPTION

Type I Howard Cascade Generation

A type I Howard Cascade (Cascade) superficially resembles a tree structure, but it is not a tree structure. The differences among a binomial tree (which the standard Cascade most resembles), a perfect binary tree, and a binomial-based Howard Cascade lie in how each is generated and the number of communication channels used in their expansion. These three types of tree and tree-like functions are respectively depicted in FIGS. 1-3.

Each of the figures (diagrams) described herein is partitioned into a sequential series of time steps, as indicated by the numbers at the bottom of each diagram and the corresponding sections of each diagram separated by vertical dashed lines. The top section of each diagram includes a generator, which generates the tree structure(s) below the horizontal dashed line. In each time step, one or more arrows indicate communication channels between an existing node and one or more nodes that are generated in that particular time step. Each node may represent a computational element or device, such as a processor or other computing entity.

Figure 1:
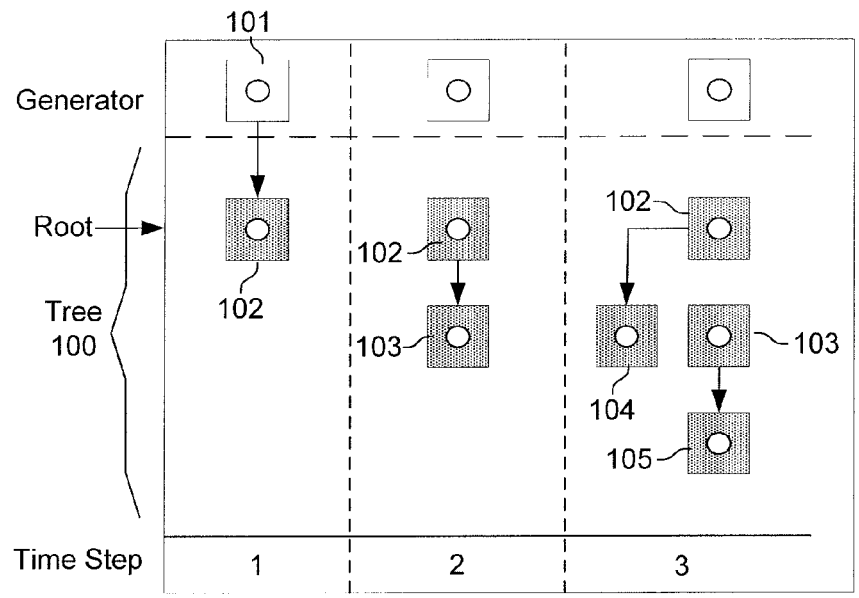
FIG. 1 is a diagram showing an exemplary set of steps in a (prior art) binomial tree expansion.
Figure 2:
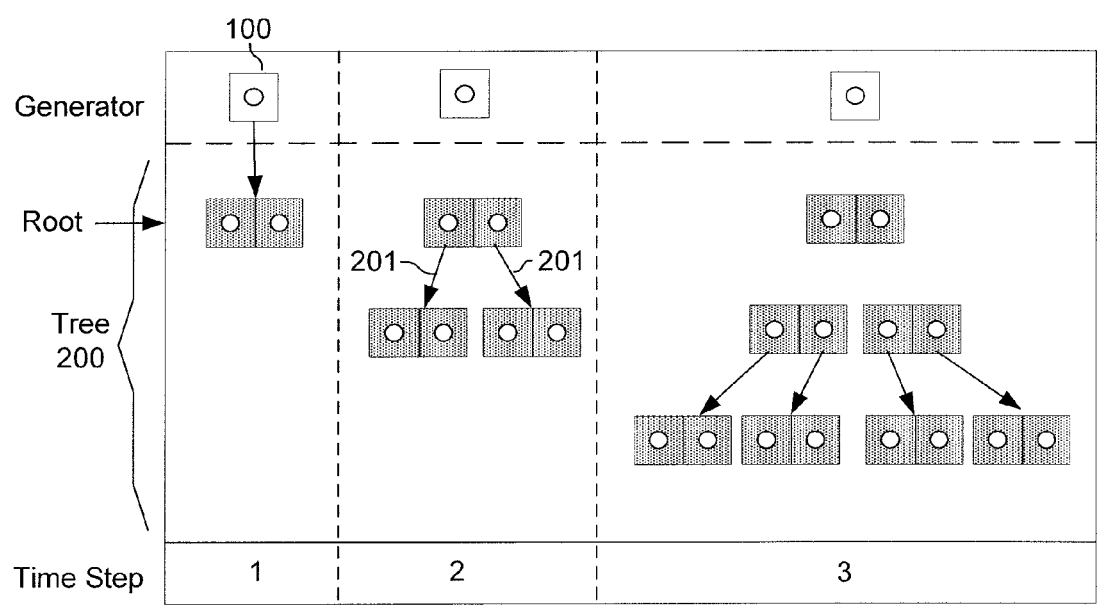
FIG. 2 is a diagram showing an exemplary set of steps in a (prior art) perfect binary tree expansion.

FIG. 1 is a flowchart showing an exemplary set of steps in a (prior art) binomial tree expansion. As shown in FIG. 1, in time step 1, generator 101 generates root node 102 of a binary tree 100. The binomial tree is said to be generated, which means that there is some function—the generator function—that initiates the construction of the tree. Note that the generator function is not part of the tree; it only creates the root of the tree. In a binomial tree expansion, shown in FIG. 1, only a single tree is generated for a binomial tree. After initial generation of a root (the beginning of the tree), the tree starts dividing. At each subsequent time step, as indicated in time steps 2 and 3, each portion of the binomial tree again divides, using a single communication channel per node. Thus, as shown in FIG. 2, node 103 is generated in time step 2, and nodes 104 and 105 are generated in time step 3. The growth sequence of generated nodes is $\{1, 2, 4, \ldots, 2^n\}$, where n=(time step)−1. If the number of communication channels at the tree level is increased from one to two, and each node is allowed to expand only once, then a perfect binary tree is created, as shown in FIG. 2.

FIG. 2 is a diagram showing an exemplary set of steps in a (prior art) perfect binary tree expansion. As with the binomial tree, only a single tree is generated for the perfect binary tree 200. As shown in FIG. 2, at each time step, each node uses two channels 201 to generates two new nodes. The sequence of generated nodes for a perfect binary tree is $\{1, 3, 7, \ldots, 2^n-1\}$, where n=(time step).

Figure 3:
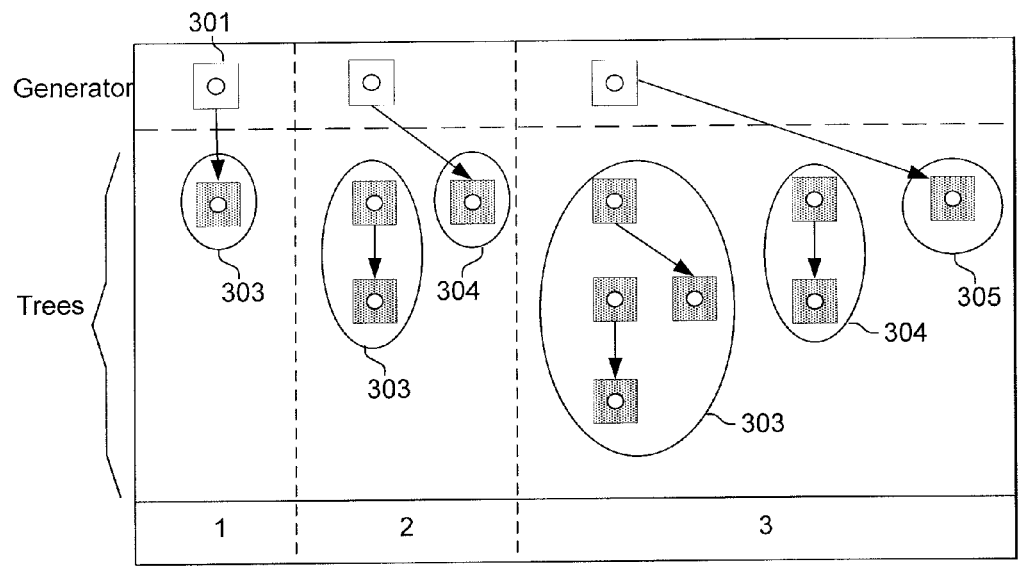
FIG. 3 is a diagram showing an exemplary set of steps performed in expansion of a binomial-based Type I Howard cascade, with a single channel generator and single channel trees.

FIG. 3 is a diagram showing an exemplary set of steps in expansion of a binomial-based Type I Howard cascade, with a single channel generator 301 and single channel trees. Instead of increasing the number of channels and limiting the expansion per node to one, a binomial-tree-based Type I Howard Cascade continuously generates additional trees. For example, trees 303, 304 and 305 are initially generated in time steps 1, 2, and 3, respectively, and each tree expands using a single communication channel (indicated by each of the arrows in FIG. 3) while allowing each node to generate at least one additional node at each time step.

The sequence of generated nodes for the Cascade is $\{1, 3, 7, \ldots, 2^n-1\}$, where n=(time step). Even though the sequence of generated nodes superficially resembles a perfect binary tree, the Cascade is not one. In parallel processing applications, a Cascade has almost twice the efficiency of a binomial tree, yet uses one half of the communication pathways of a perfect binary tree. Rather than representing a tree, the Cascade shown in FIG. 3 represents a mathematical forest of time-ordered binomial trees. The generator level and the tree level can have more than a single communication channel, as shown in FIG. 3.

Scattering/Gathering

In parallel computing, a data scatter operation sends data from one processing node to all other processing nodes within a particular group.

Agglomeration refers to (a) the gathering of individual results from each processing node and (b) the formatting of these results into a complete solution. Each processing node sends its results to the processing node that is directly upstream. The flow of results thereby occurs in reverse sequence order of the initial expansion within a Cascade.

A direct result of agglomeration is that the results from each node maintain the same ordered relationship as the decomposition of the initial dataset. Each processing node knows how many downstream processing nodes it has; and the subsequent downstream results, from the downstream nodes, form a contiguous block of data. Each of the processing nodes has its results data, and the location and size information that enables the upstream processing node to properly position the results, when received. As the results are sent upstream through a Cascade, the size of the result information expands contiguously until the entire result block is assembled at a home node.

Figure 4:
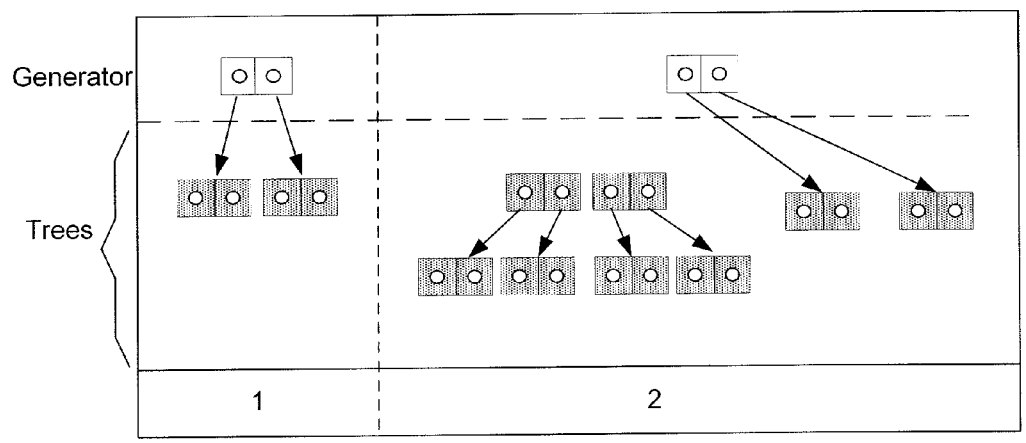
FIG. 4 is a diagram showing an exemplary set of steps performed in expansion of a binomial-based Type I Howard Cascade, with duo-channel generator and duo-channel trees.

FIG. 4 is a diagram showing an exemplary set of steps performed in expansion of a binomial-based Type I Howard Cascade, with duo-channel generator and duo-channel trees. The general equation for a Standard Type I Howard Cascade with an arbitrary number of generator and tree communication channels is given in Equation 1:

Standard Type I Howard Cascade $$P_\phi = \psi \Sigma^1_\phi (\nu+1)^{\phi-1}; \text{ iff } \phi > 0$$

$$P_\phi = 0; \text{ iff } \phi \leq 0 \qquad \text{Equation 1}$$

Where:
ψ≡number of generator level communication channels
ν≡number of tree level communication channels
ϕ≡number of time steps The term $(\nu+1)^\phi$ takes the place of $2^n$. Therefore, a single tree-level communication channel gives $(\nu+1)^\phi = (1+1)^\phi = 2^\phi = 2^n$. The term $2^n$ creates the sequence for a binomial tree. Similarly, two communication channels gives $3^\phi$ (the sequence of the trinomial), and the general case gives all n-nomial trees. Thus, the standard Type I Howard Cascade can be based upon any single n-nomial tree.

Type I Howard Cascades with Controlled Tree Generation

The generation of the trees found in Type I Howard Cascades can be directly manipulated using Equation 1 above. This equation shows that multiple summed "$(\nu+1)^\phi$" terms can be used together to produce a Cascade. The type of summation used directly affects the number of trees generated. The summation index position represents which tree is activated by the generator as well as the order of tree activation. Replacing the symbol for summation with the sum function and the term $(\nu+1)^{\phi-1}$ with a binomial-tree node-count calculating function changes Equation 1 to the following:

Type I Howard Cascade Alternative Equation $$P_\phi = \psi(\text{SUM}-(\phi, f((\phi-1), \psi, \nu))); \text{ iff } \phi > 0$$

$$P_\phi = 0; \text{ iff } \phi \leq 0 \qquad \text{Equation 2}$$

where SUM−(, f((ϕ(ϕ−1), ψ, ν))≡a decrementing sum: the value of ϕ decreases at each time step, while the calculated binomial counts are summed together.

f((ϕ−1), ψ, ν)≡binomial-tree node-count calculating function

There are an enormous number of SUM functions available for use in a Cascade, allowing for different patterns of tree creation to occur. It can be seen that selecting the active generation pattern is really selecting which function is summed upon. For example, using a Fibonacci SUM sequence rather than a decrement sum gives the following as a Cascade:

Sum Sequence={0, 1, 2, 3, 4, 5, . . . }
Fibonacci Sequence={0, 1, 1, 2, 3, 5, . . . }

Figure 5:
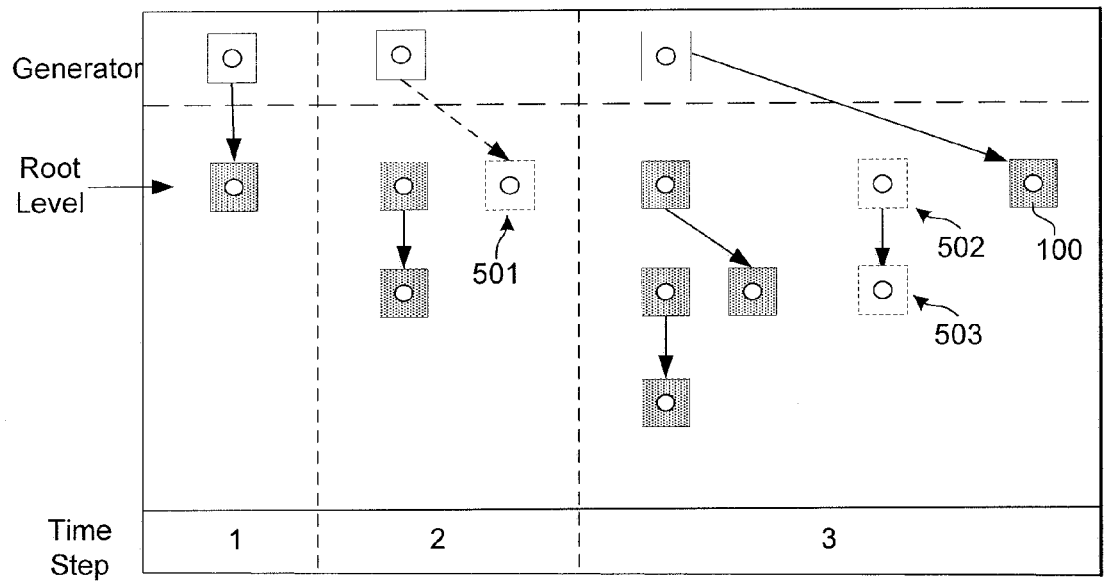
FIG. 5 is a diagram showing an exemplary set of steps performed in expansion of a binomial Howard Cascade using sum Fibonacci instead of sum root-level expansions.

FIG. 5 is a diagram showing an exemplary set of steps performed in expansion of a binomial Howard Cascade using sum Fibonacci instead of sum root-level expansions. Note the skipped computational elements 501, 502, and 503, relative to the sum root-level expansion. The expansion of each tree of the Cascade is, thus, given by the binomial tree pattern, leading to an important observation: each tree within a Cascade represents its own separate series expansion, entirely independent from the other Cascade trees and can be represented by its own n-nomial tree equation.

Type I Howard Cascades with Multiple Different Trees

A Cascade strip is a single tree in the forest of trees in a Cascade. Each tree is numbered from 1-n where the number is the time step used to generate the tree. Using the n-nomial tree pattern described above allows each Cascade strip to be shown as:

N-Nomial Tree Series $$P_\phi = (v+1)^\phi + (v+1)^{\phi-1} + (v+1)^{\phi-2} + \ldots + (v+1)^0 \quad \text{Equation 3}$$

Next, the n-nomial series is converted to its constituent series expansion, noting that this is the number of connections made at each level of a binomial series.

Binomial Connection Terms as Series $$\text{Connections} = \{0, 1, 2, 4, 8, 16, \ldots, \Sigma^{\phi-1}_{n=0} 2^\phi\} \quad \text{Equation 4}$$

Since the trinomial is 2× the binomial and the 4-nomial is 3× the binomial, n-nomial is given by:

N-Nomial Connection Terms as Series $$P_s = v\Sigma^{\phi-1}_{n=0} 2^\phi = \Sigma^{\phi-1}_{n=0} v(2^\phi) \quad \text{Equation 5}$$

The possible expansions used at the Cascade strip level can now be explicitly shown, depending upon v:

$$P_S = \Sigma^\phi_{n=0} \text{Binomial}, P_S = \Sigma^\phi_{n=0} \text{Trinomial}, \ldots$$
$$P_S = \Sigma^\phi_{n=0} \text{Polynomial}$$

By allowing a different value of v at each time step, the tree type can be changed at each time step, giving:

Use of Variable Sum Function in Type I Howard Cascade $$P_\phi = \psi(\text{SUM} - (I, \text{SUM}_{X,\phi}(v_I, \phi-1, \psi, v))) \quad \text{Equation 6}$$

Figure 6:
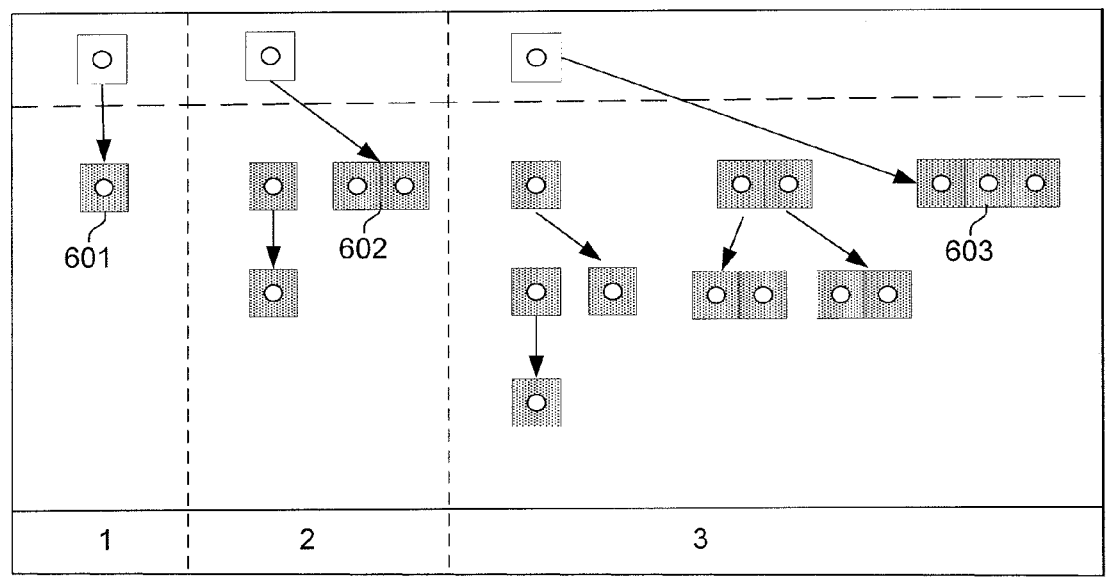
FIG. 6 is a diagram showing an exemplary set of steps performed in expansion of a Type I Howard Cascade with multiple n-nomial tree-level basis functions.

Where
$v_I$=Value of v at time step index
I=Current position of the outer sum
$\text{SUM}_{X,\phi}$=Type of n-nomial sum function (x) at time step $\phi$ FIG. 6 is a diagram showing an exemplary set of steps performed in expansion of a Type I Howard Cascade with multiple n-nomial tree-level basis functions. Due to the time-ordered nature of a Type I Howard Cascade, it is possible for the last node(s) that receive data to take an inordinately long time processing that data, because the processing had to wait on the receipt of the dataset. There are two methods of handling this problem—either decrease the dataset size as a function of the order that the data is received by the nodes, or increase the processing performance as a function of the order that the data is received. FIG. 6 shows a method for continuously increasing the amount of processing power used to process a given dataset as a function of the order that the nodes receive their data.

Use of Non-N-nomial Trees in a Type I Howard Cascade

Since each tree can be created differently by substituting the inner loop sum, a non-n-nomial rooted tree can be substituted for an n-nomial tree at any time step of the Cascade. The only difference is the type of sum that is used at a particular time step. This changes the meaning of $\text{SUM}_{x,\phi}$ found in Equation 6 to any rooted tree sum function.

Figure 7:
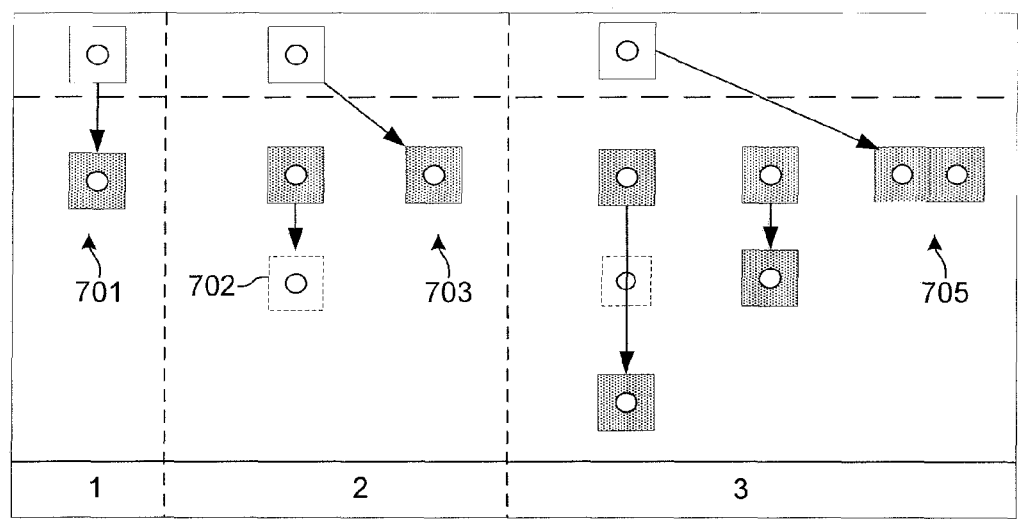
FIG. 7 is a diagram showing an exemplary set of steps performed in expansion of a Type I Howard Cascade with non-N-nomial trees.

FIG. 7 is a diagram showing an exemplary set of steps performed in expansion of a Type I Howard Cascade with non-N-nomial trees. In FIG. 7, tree 701 is a Fibonacci series-based tree, tree 703 is a binomial tree, and tree 705 is a trinomial tree. Note that node 702 is skipped, that is, the node is not actually generated, in the expansion of tree 701 in time step 3.

Using Type I Howard Cascade Effects to Balance Computational Element Performance within a Cluster Monotonic Type I Howard Cascades As described above, it is possible to construct a Type I Howard Cascade using multiple, different tree functions. If the tree functions of a Cascade are such that at each expansion step the number of channels per node is either continuously increasing or continuously decreasing, then that Cascade is said to be monotonic.

Figure 8:
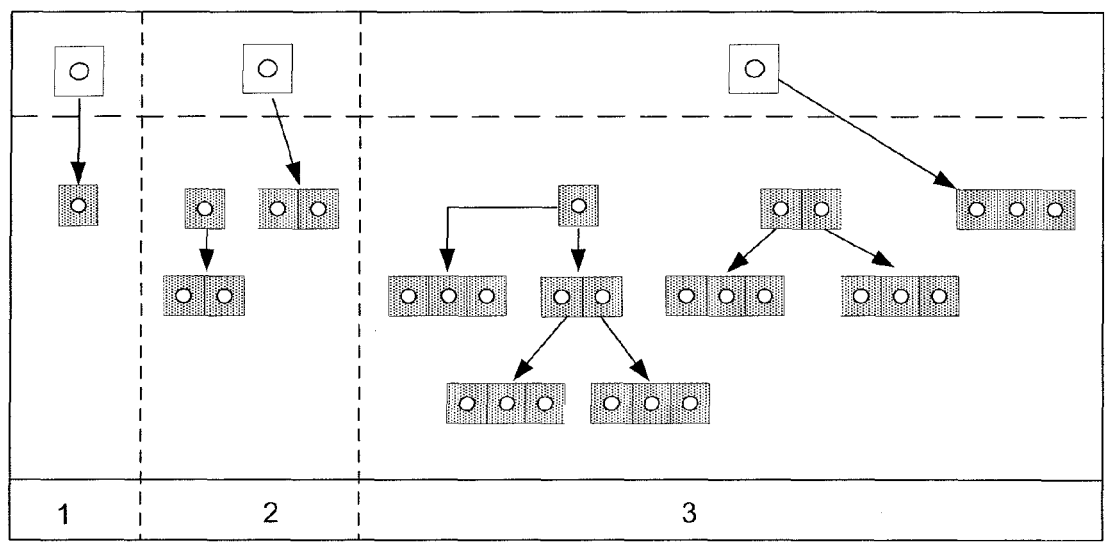
FIG. 8 is a diagram showing an exemplary set of steps performed in expansion of a variable rate monotonic Type I Howard Cascade using communication channels.

FIG. 8 is a diagram showing an exemplary set of steps performed in expansion of a variable rate monotonic Type I Howard Cascade using communication channels to interconnect the nodes in each tree, as indicated by the arrows. The structure of a Cascade remains monotonic if the number of channels follows the expansion rate. The monotonic Cascade shown in FIG. 8 generates the nine nodes shown in time step 3 in three expansion steps rather than the standard seven nodes. The rate of increase/decrease accelerates per expansion time step using this method. There can be any group of rooted trees forming the basis of the monotonic Cascade, as long as the monotonicity is maintained.

Variable Rate Monotonic Howard Cascades

If the basis functions of a Cascade are such that, at each expansion step, the number of channels per node varies but the number of channels does not continuously increase or decrease, then that Cascade is a variable rate Cascade.

Figure 9:
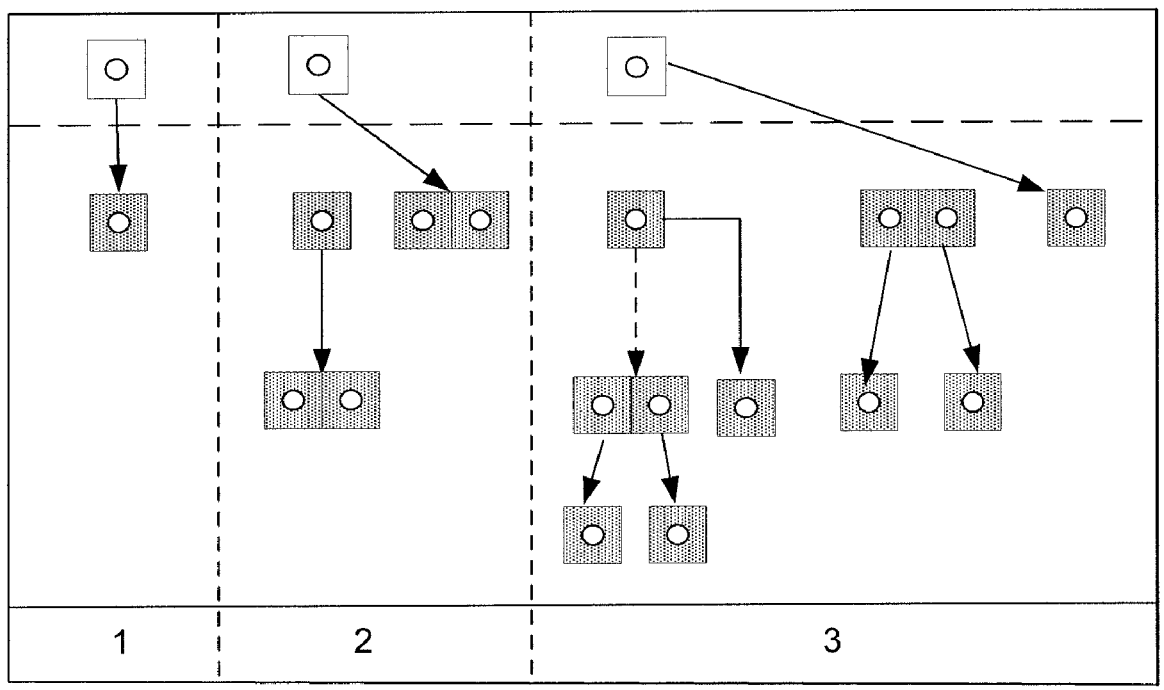
FIG. 9 is a diagram showing an exemplary set of steps performed in expansion of a variable rate Type I Howard Cascade using communication channels.

FIG. 9 is a diagram showing an exemplary set of steps performed in expansion of a variable rate Type I Howard Cascade using communication channels to interconnect the nodes in each tree, as indicated by the arrows. Note that FIG. 9 shows that each node generated at a particular time step contains the same number of channels. This is called a variable rate monotonic Howard Cascade. If the synchronization of channels per time step is not maintained then neither the time-aligned basis of a Cascade nor the non-data collision basis without a synchronization signal requirement of a Cascade is maintained; thus, such a Cascade cannot exist as it does not meet the requirements.

Cluster Computational Element Imbalances

Slow Processing Imbalance

In a generally homogeneous computational element processing performance environment, if the processing performance of a computational element is slower than the average speed of all of the processors working on the same job due to slow processors, lower than average core counts and/or slow communication channels, then the following process can be used to rebalance the performance.

Slow Processing Rebalancing Process:
1) Using the standard (target) computational element performance and the standard (target) communication channel performance compare the performance of each computational element.
2) Any computational element not within a predefined performance tolerance causes the computational element directly upstream (when agglomerating) or directly downstream (when data scattering) to generate (or if already generated, to use) a virtual channel to another computational element.
3) The performance of the new computational element can be matched to produce the required aggregate performance by changing the clock speed of the new computational element prior to its use. Alternatively, the new computational element can take the place of the old one, if its performance is within the predefined tolerance of the target computational element performance rate.

4) Any computational element whose communication performance is out of tolerance will cause the computational element directly upstream (when agglomerating) or directly downstream (when scattering) to generate (or if already generated, to use) an additional communication channel to/from the low channel performing computational element.

5) The performance of the new channels can either be used to increase the total bandwidth such that it matches the target channel performance, or the new channel can take the place of the old virtual communication channel if the new communication channel performs at the target rate.

Figure 10:
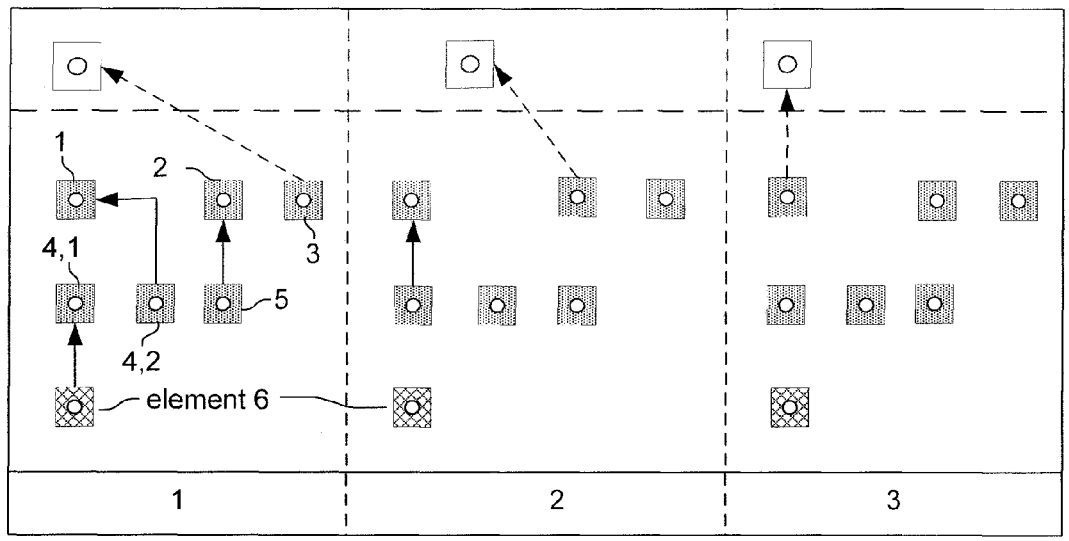
FIG. 10 is an exemplary diagram showing a processing network having unbalanced performance.
Figure 11:
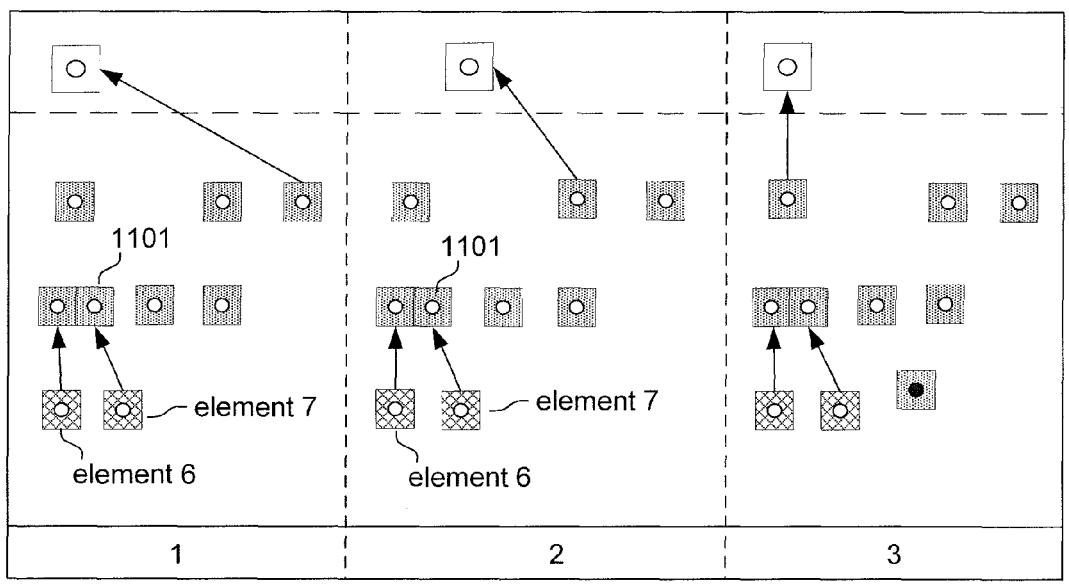
FIG. 11 is an exemplary diagram showing the use of a variable rate monotonic Howard Cascade to balance the system performance of the network shown in FIG. 10.

FIG. 10 is an exemplary diagram showing a processing network having unbalanced performance, and FIG. 11 is an exemplary diagram showing the use of a variable rate monotonic Howard Cascade to balance the system performance of the computing network shown in FIG. 10.

Example 1

If processors on computational elements 6 and 7 shown in FIG. 10 and FIG. 11 generate one-half of the average performance of the other computational elements working on some problem, then connecting those computational elements together with a variable rate monotonic Howard Cascade connected via virtual channels allows the performance to be balanced.

As shown in FIGS. 10 and 11, the channel performance of a system whereby a computational element (element 6) has one half the average performance can be re-balanced by having sub-element 4,1 detect (or compute) the performance deficit and using the required number of virtual channels needed to access sufficient computational elements to make up the performance deficit, invoking element 7 (which has approximately the same performance as element 6). The work that element 6 would have performed is then evenly shared between element 6 and element 7.

Figure 12A:
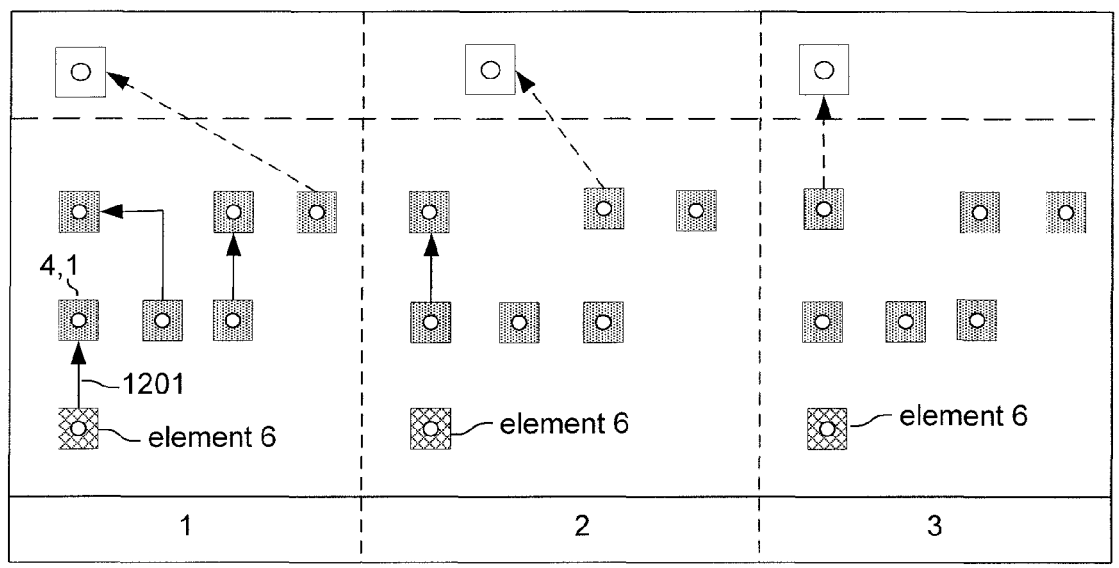
FIGS. 12A and 12B are diagrams showing an exemplary method of balancing communication channel performance using a variable rate monotonic Howard Cascade.
Figure 12B:
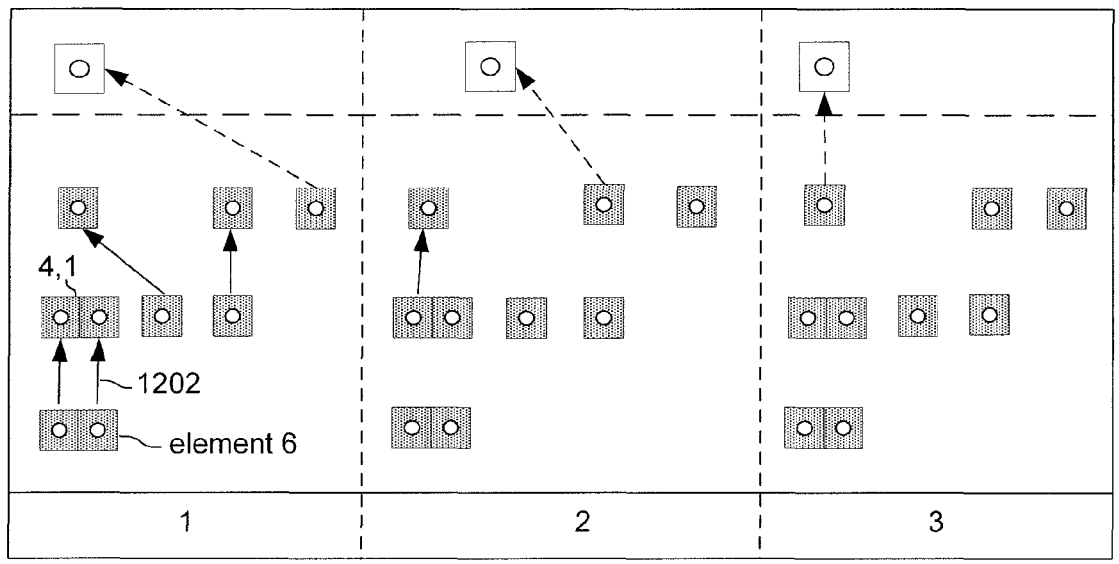

FIGS. 12A and 12B are diagrams showing an exemplary method of balancing communication channel performance using a variable rate monotonic Howard Cascade.

Example 2

If channels on computational element 6 shown in FIG. 12A generate one-half of the average performance of all computational element channels working on the same problem, then another channel that also generates one-half the average channel performance can be added to rebalance the channel performance. This may be accomplished with the use of virtual channels and a variable rate monotonic extension to an existing Howard Cascade.

As shown in FIG. 12B, the channel performance of the system shown in FIG. 12A, wherein computational element (element 6) has one half the average channel performance, can be rebalanced, by sub-element 4,1 detecting (or computing) the performance deficit and using the required number of virtual channels, invoking an additional channel 1202 which has the same performance as the original element 6.

Fast Processor Imbalance

In a generally homogeneous computational-element processing-performance environment, if the processing performance of a computational element is faster than the average speed of all of the processors working on the same job due to faster processors, higher than average core counts and/or fast communication channels, then the method described below with respect to FIGS. 13A and 13B can be used to rebalance the system performance.

Figure 13A:
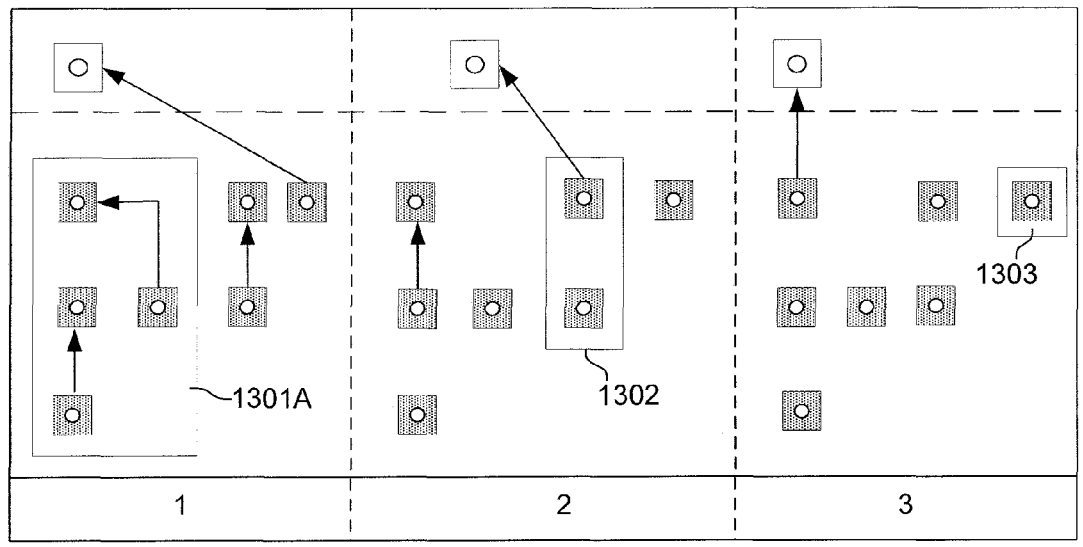
FIGS. 13A and 13B are diagrams showing an exemplary method of balancing computational element performance using a Howard Cascade with mixed Fibonacci and binomial basis.
Figure 13B:
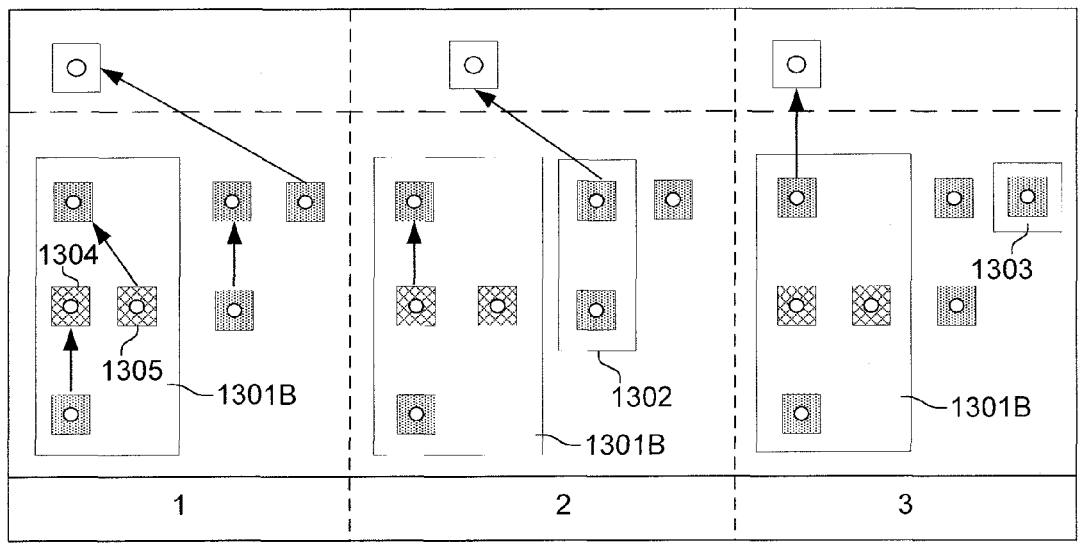

FIGS. 13A and 13B are diagrams showing an exemplary method of balancing computational element performance using a Howard Cascade with mixed Fibonacci and binomial basis. FIG. 12A shows an initial system configuration which includes binomial trees 1301, 1302, and 1303.

Example 3

If the processors on Cascade strip 1 (block 1301A) in FIG. 13A are, for example, ~43 percent faster than the average of all computational elements in the system, then the steps shown in FIG. 13B may be performed to relieve the system performance imbalance. As shown in FIG. 13B, A Fibonacci tree 1201B is substituted for binomial tree 1301A, thus causing nodes (computational elements) 1304 and 1305 to be skipped, which balances the system performance in view of the relatively slower processors in binomial trees 1302 and 1303.

Figure 14A:
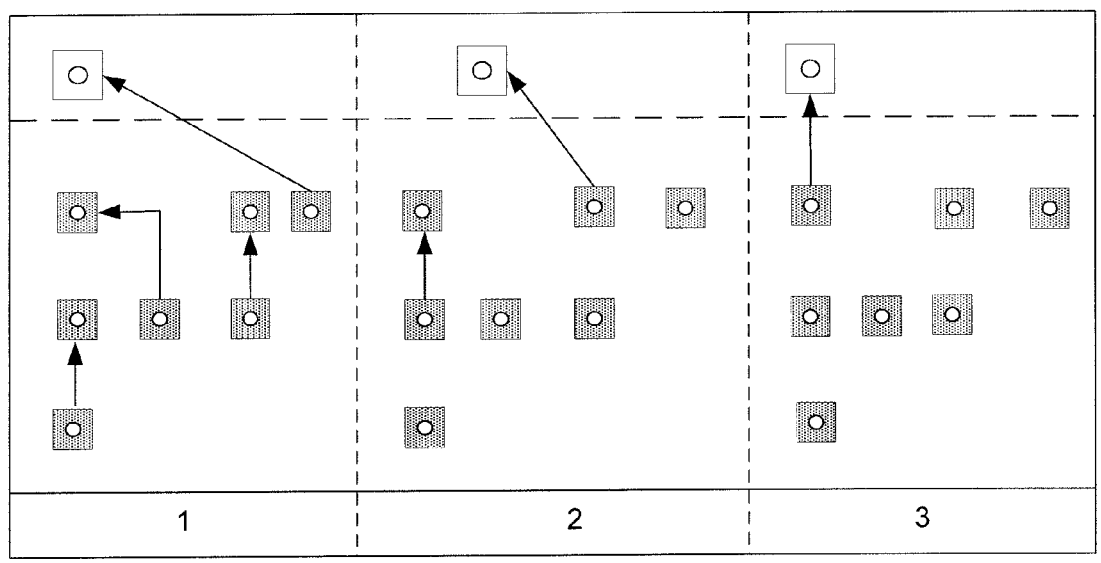
FIGS. 14A and 14B are diagrams showing an exemplary method using root-level contraction and mixed basis to select the computational element count.
Figure 14B:
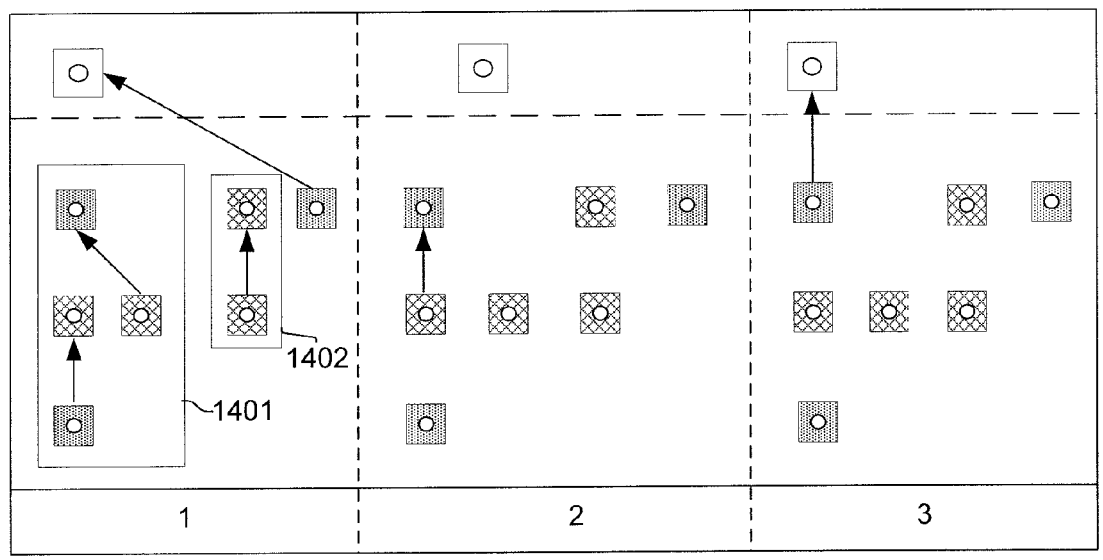

FIGS. 14A and 14B are diagrams showing an exemplary method using root-level contraction and mixed basis to select the computational element count. FIG. 14A shows incremental expansion and contraction of three binomial trees, while FIG. 14B shows expansion and contraction of a Fibonacci tree 1401 which replaces the corresponding (first) binomial tree (in FIG. 14A), and also shows (additional) skipped computational elements 1402 in the second binomial tree.

Example 4

When the number of computational elements generated is the maximum possible given an n-nomial expansion, the current number of time steps, and the number of communication channels, the result is called a Type I Cascade sweet spot. Using both the root-level expansion and mixed basis to select a non-sweet spot computational-element count shows the selection of four computational elements in FIG. 14B as opposed to the seven elements in the initial configuration of FIG. 14A. Note that any number of computational elements can be generated by changing the basis functions. Thus, even though a standard single channel Type I Cascade cannot generate 4 nodes, changing the basis function nevertheless allows non-sweet spot node counts. As can be seen in the present example, mixing root level with basis changes allows for a wide range of effects, as shown in FIGS. 14A and 14B.

Mixed Conditions

Figure 15A:
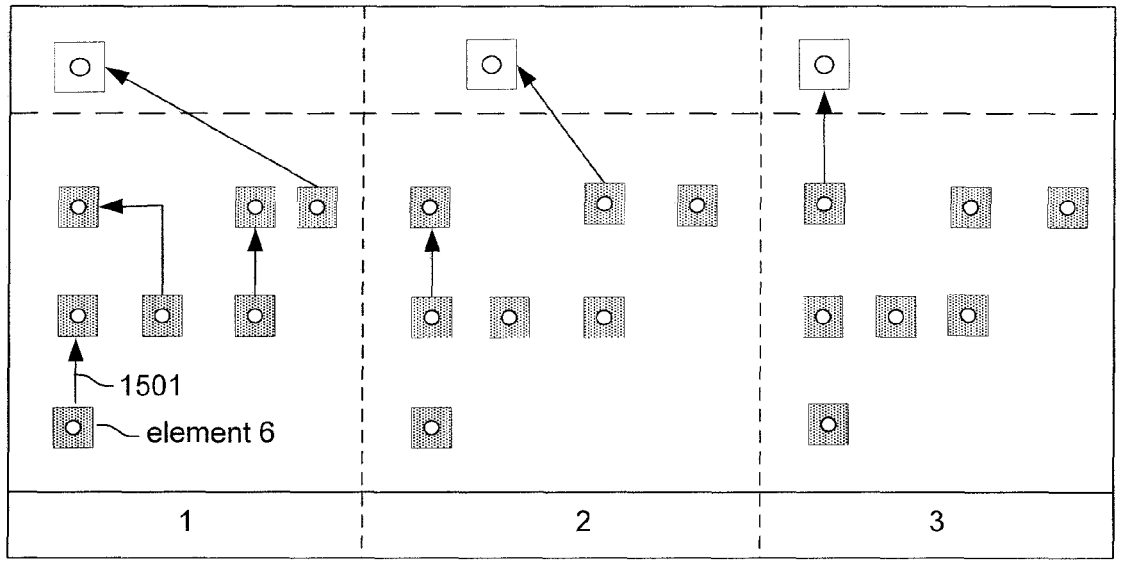
FIGS. 15A and 15B are diagrams showing an exemplary method using mixed transformation, root expansion, and channel count.
Figure 15B:
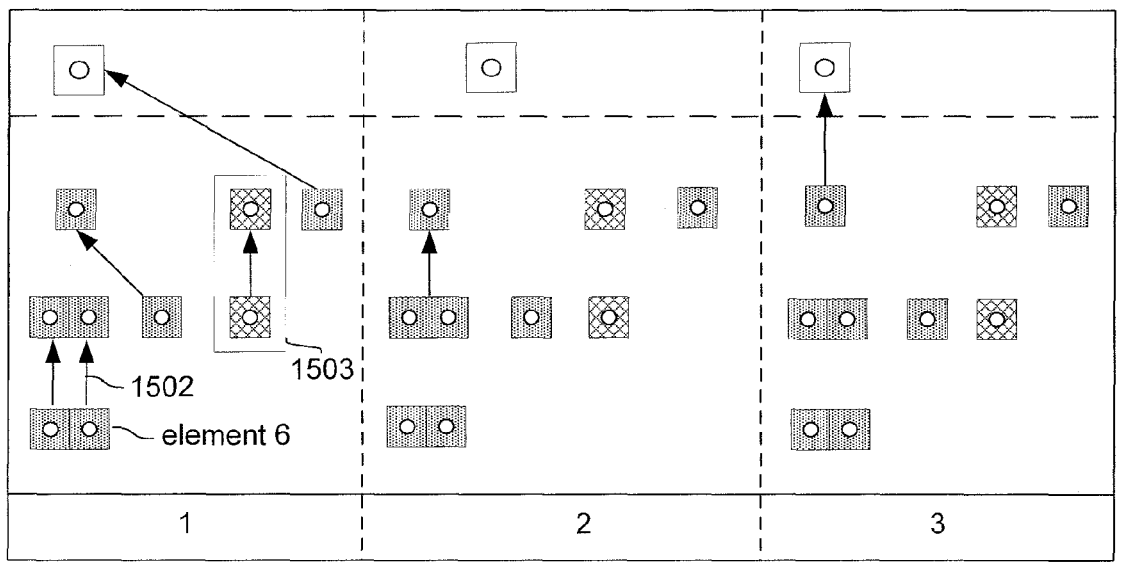

FIGS. 15A and 15B are diagrams showing an exemplary method using mixed transformation, root expansion, and channel count. A mixed condition occurs when the number of channels in one part of the system and the expansion model of another part of the system must be changed, allowing for maximum variation when configuring a system.

Example 5

A mixed condition is shown in FIGS. 15A and 15B, where computational element 6 requires twice the number of channels, since it has one-half the average channel performance; hence the addition of channel 1502 in FIG. 15B. In this example, expansion and contraction of a Fibonacci tree occurs in a manner analogous to that of Example 14, and likewise, computational elements 1503 are skipped to further balance the system performance. Being able to change the generation of both the type and number and order of trees provides the flexibility required to generate any node count.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A method using for performing a scatter-type data distribution among a cluster of computational devices, the method comprising:
   receiving a value T indicating a number of time steps;
   receiving a value Cg indicating a number of tree generator channels, each generating a root of a respective tree structure;
   receiving a value Ct indicating a number of communication channels per node in each said tree structure;
   initially generating Cg nodes, each connected to an initial generator, to create respective initial root nodes of an initial tree structure;
   transmitting data, from the initial generator to each of the initial root nodes;
   (a) generating Cg root nodes, each connected to a respective new generator, to create respective roots of Cg newly generated tree structures;
   (b) expanding each of the tree structures by generating Ct new nodes connected to each said node generated in each previous step;
   (c) transmitting data, to each of the new nodes from an immediately preceding one of the nodes, and from each said new generator to an associated said root node; and
   repeating steps (a) through (c) T−1 times;
   wherein each of the nodes comprises one of the computational devices.

2. The method of claim 1, wherein each of the generators and each of the nodes comprises one of the computational devices.

3. The method of claim 1, wherein the data is transmitted in reverse order relative to the order of transmission in step (c).

4. A method used for performing a scatter-type data distribution among a cluster of computational devices, the method comprising:
   receiving a value T indicating a number of time steps;
   (a) generating an initial node connected to a new generator, to create a root node of a newly generated tree structure;
   (b) expanding each said tree structure by generating a variable number V new nodes connected to the node, if any, generated in the step prior to the immediately previous execution of step (a);
   wherein V is determined by a function which creates a predetermined number of new nodes at each said time step;
   (c) transmitting data, to each of the new nodes, respectively, from an immediately preceding said node; and
   repeating steps (a) through (c) T−1 times;
   wherein each of the nodes comprises one of the computational devices.

5. The method of claim 4, wherein the function creates an N-nomial tree.

6. The method of claim 4, wherein the function creates a non-N-nomial tree.

7. The method of claim 4, wherein the function is variable on a per-tree basis.

8. The method of claim 4, wherein the data is transmitted in reverse order relative to the order of transmission in step (c).

9. The method of claim 4, wherein the processing performance of two or more slow computational devices is slower than the average speed of all the computational devices working on a common task;
   wherein the performance of the cluster is balanced by generating an increasing rate SUM function monotonic tree structure comprising the slow computational devices as nodes connected, via virtual channels, to a node generated in a next-previous time step, to distribute the data;
   wherein the time-step-previous node comprises a root node for the monotonic tree structure.

10. The method of claim 4, wherein the processing performance of two or more fast computational devices is faster than the average speed of all the computational devices working on a common task;
    wherein the performance of the cluster is balanced by substituting, for an existing said tree structure containing the fast computational devices, a relatively decreased rate SUM function tree structure to distribute the data.

11. The method of claim 4, wherein the processing performance of two or more fast computational devices is faster than the average speed of all the computational devices working on a common task;
    wherein the performance of the cluster is balanced by removing a sufficient number of the computational devices from the tree structure containing the fast computational devices.

12. The method of claim 4, wherein the performance of each of two slow communication channels is slower than the average channel performance of all the communication channels in the cluster;
    wherein the performance of the cluster is balanced by substituting, for an existing said tree structure containing the slow communication channels, a relatively increased rate SUM function tree structure.

13. The method of claim 4, wherein the performance of each of two slow communication channels is slower than the average channel performance of all the communication channels in the cluster;
    wherein the performance of the cluster is balanced by adding at least one virtual channel between the computational devices connected by one of the slow communication channels.

14. The method of claim 4, wherein the performance of each of two fast communication channels is faster than the average channel performance of all the communication channels in the cluster;
    wherein the performance of the cluster is balanced by substituting, for an existing said tree structure containing the fast communication channels, a relatively decreased rate SUM function tree structure.

15. The method of claim 9, wherein the data is transmitted in reverse order relative to the order of transmission in step (c).

16. The method of claim 10, wherein the data is transmitted in reverse order relative to the order of transmission in step (c).

17. The method of claim 11, wherein the data is transmitted in reverse order relative to the order of transmission in step (c).

18. The method of claim 12, wherein the data is transmitted in reverse order relative to the order of transmission in step (c).

19. The method of claim 13, wherein the data is transmitted in reverse order relative to the order of transmission in step (c).

20. The method of claim 14, wherein the data is transmitted in reverse order relative to the order of transmission in step (c).

* * * * *